United States Patent
Iizuka et al.

(10) Patent No.: US 8,050,702 B2
(45) Date of Patent: Nov. 1, 2011

(54) MOBILE STATION AND TRANSMISSION POWER CONTROL METHOD IN MOBILE STATION

(75) Inventors: Yousuke Iizuka, Yokosuka (JP); Yukihiko Okumura, Yokosuka (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 723 days.

(21) Appl. No.: 12/143,409

(22) Filed: Jun. 20, 2008

(65) Prior Publication Data

US 2008/0318614 A1    Dec. 25, 2008

(30) Foreign Application Priority Data

Jun. 21, 2007    (JP) .................... 2007-163718

(51) Int. Cl.
*H04B 7/00* (2006.01)
*H04Q 12/11* (2006.01)
*H04M 1/00* (2006.01)

(52) U.S. Cl. ..... 455/522; 455/69; 455/127.1; 455/562.1

(58) Field of Classification Search .................. 455/522, 455/69, 127.1, 67.13, 63.1, 101, 562.1, 524, 455/525

See application file for complete search history.

(56) References Cited

U.S. PATENT DOCUMENTS

| | | | | |
|---|---|---|---|---|
| 7,116,944 B2 * | 10/2006 | Das et al. | ......... | 455/69 |
| 7,499,709 B2 * | 3/2009 | Das et al. | ......... | 455/455 |
| 7,925,302 B2 * | 4/2011 | Ulupinar et al. | ......... | 455/562.1 |
| 2003/0148738 A1 * | 8/2003 | Das et al. | ......... | 455/67.5 |
| 2003/0148770 A1 * | 8/2003 | Das et al. | ......... | 455/455 |
| 2005/0277419 A1 * | 12/2005 | Takano et al. | ......... | 455/442 |
| 2006/0068791 A1 * | 3/2006 | Lindoff | ......... | 455/442 |

FOREIGN PATENT DOCUMENTS

| | | |
|---|---|---|
| EP | 1 681 782 A2 | 7/2006 |
| EP | 1 833 268 A1 | 9/2007 |
| JP | 2004-007030 | 1/2004 |
| JP | 2004-080235 | 3/2004 |
| JP | 2004-088271 | 3/2004 |
| JP | 2006-173924 | 6/2006 |
| JP | 2006-203274 | 8/2006 |

* cited by examiner

*Primary Examiner* — Tilahun B Gesesse
(74) *Attorney, Agent, or Firm* — Crowell & Moring LLP

(57) ABSTRACT

To provide a mobile station and a transmission power control method in the mobile station, which are capable of improving the power saving characteristic associated with the transmission power control in the mobile station under a condition in which the transmit diversity is applied. The transmission power of feedback information (11: FBI) is controlled on the basis of control information (TPC) transmitted through a sub-information downlink channel (21) from a base station (210) as a main branch, only when it is determined by a communication method determining section 103 that a cosed loop transmit diversity can be applied (step S201: Yes), and when it is determined by a communication base station determining section 104 that sub-information downlink channels (21, 22) and sub-information uplink channels (11, 12) are connected to a plurality of base stations (step S202: Yes).

7 Claims, 9 Drawing Sheets

PRIOR ART

PRIOR ART

PRIOR ART

| TPC BIT OF BASE STATION 210 | up | down | up | down |
|---|---|---|---|---|
| TPC BIT OF BASE STATION 220 | up | up | down | down |
| TRANSMISSION POWER OF MOBILE STATION 100 | up | down | down | down |

PRIOR ART

PRIOR ART

MOBILE STATION AND TRANSMISSION POWER CONTROL METHOD IN MOBILE STATION

CROSS REFERENCE TO THE APPLICATION OF FOREIGN PRIORITY

The application has foreign priority Japan document 2007-163718 filed Jun. 21, 2007.

BACKGROUND OF THE INVENTION

1. Field of the Invention

The present invention relates to a mobile station and a transmission power control method in the mobile station.

2. Description of the Related Art

In recent years, according to rapid spread of the Internet, and to the space diversity and increasing capacity of information communication, and further according to a trend toward the development of the next generation Internet, the research and development of next generation radio access system for realizing high speed radio transmission in mobile communication have been energetically performed.

In such high speed radio communication, the development of technique for space diversity is a key for realizing more efficient communication in a same radio environment.

In particular, a transmission technique for space diversity, by which signals transmitted from a plurality of antennas on the base station side are received and synthesized by a reception terminal (mobile station), is mandatorily prescribed by the standard in the 3GPP (Third Generation Partnership Project).

In particular, a closed loop transmit diversity, by which a mobile station determines the phase of a signal transmitted from a base station and feedbacks the phase rotation information to the base station, has a high diversity gain, and hence has been widely used in the present third generation communication.

Further, in the next generation high speed communication transmission, the adaptive modulation and channel coding (AMC) in which the throughput is changed according to the reception environment of a reception terminal, and a hybrid ARQ (Automatic Repeat Request) which performs the packet retransmission and synthesis, are applied. Thus, a system configured to perform communication only with a cell in a best reception environment, is adopted, unlike the conventional W-CDMA technique which simultaneously effects connection with a number of cells.

FIG. 6 and FIG. 7 are conceptual diagrams for explaining phase states in the case of adopting the transmit diversity. FIG. 6 represents an open loop transmit diversity in which feedback information from a mobile station is not used, and FIG. 7 represents a cosed loop transmit diversity in which the phase of a transmission signal, and the like, is controlled on the basis of feedback information transmitted from a mobile station. The both modes are adopted in the W-CDMA system standardized in the 3GPP.

In FIG. 6, when a same signal TS is transmitted as signals TS1 and TS2 from two antennas (not shown) of a base station, the signals reach a mobile station (not shown) as a signal RS1 and a signal RS2 through a radio space which is a propagation path.

A diversity combining gain can be obtained by combining the signal RS1 and the signal RS2 in the mobile station. However, the diversity combining gain may not be obtained because the phase of the signal is rotated in the radio propagation path.

That is, in the case of FIG. 6, the signal TS1 reaches the antenna of the mobile station as the signal RS1 with no phase rotation, while the signal TS2 reaches the antenna of the mobile station as the signal RS2 with a phase rotated by +90 degrees.

Therefore, when the signal RS1 and the signal RS2 are synthesized, the diversity combining gain is deviated, so that a prescribed gain (ideally two times) cannot be obtained.

On the other hand, in the cosed loop transmit diversity shown in FIG. 7, the amount of phase rotation in the radio propagation path is culculated separately for each transmission antenna in the mobile station. Feedback information, which requires the each antenna to transmit a signal with a phase shifted beforehand on the basis of the culculated result, is transmitted from the mobile station to the base station.

That is, when two signals TS1 and TS2 are transmitted from the two antennas through the radio propagation path, the signal TS2 reaches the antenna of the mobile station as the signal RS2 with the phase rotated by +90 degrees, as described above with reference to FIG. 6. However, in the cosed loop transmit diversity, the signal TS2 is transmitted as a signal RS2 with a phase rotated beforehand by −90 degrees with respect to the signal TS1. Thereby, the phases of the signal RS1 and the signal RS2, which reach the mobile station, are made to coincide with each other, so that the prescribed gain can be obtained.

Note that in the 3GPP, the open loop transmit diversity includes the STTD (Space Time block coding based Transmit Diversity) and the TSTD (Time Switched Transmit Diversity), and in the cosed loop transmit diversity, there are specified the mode 1 which controls only the phase, and the mode 2 which controls both the phase and the amplitude.

As will be described below, the present invention relates to a problem caused in the case where the cosed loop transmit diversity is applied, but the present invention can be applied regardless of the difference between the above described mode 1 and mode 2. Thus, in the following description, the above described modes are not specifically distinguished.

FIG. 8 is a conceptual diagram showing a state of communication in which conventional individual channels are used. A plurality of base stations 210 and 220 (for convenience of explanation, two base stations are shown in FIG. 8) and a mobile station 100 are connected to each other by uplink control channels 11 and 12, downlink control channels 21 and 22, and downlink data channels 31 and 32.

The timing, rate, and the like, which relate to data transfer in the downlink data channel 31 are adjusted by control signals of the uplink control channel 11 and the downlink control channel 21. Similarly, the timing, rate, and the like, which relate to data transfer in the downlink data channel 32 are adjusted by control signals of the uplink control channel 12 and the downlink control channel 22.

FIG. 9 is a conceptual diagram showing a state of communication in which data transfer is performed by using a shared channel as in the HSDPA proposed by the 3GPP.

In the HSDPA (High Speed Downlink Packet Access), a high-speed physical downlink shared channel 31 (HS-PDSCH) is used as the downlink channel used for information (data) transfer from the base stations 210 and 220 to the mobile station 100.

That is, the HS-PDSCH is used for data transmission from the respective base stations 210 and 220 to the plurality of mobile stations 100 (for convenience of explanation, only one mobile station is shown in FIG. 9).

The base stations 210 and 220 determine a schedule on the basis of which data transmission is performed to each of the plurality of mobile stations 100, and perform data transfer at a different timing to the each mobile station 100.

In the HSDPA, each of the base stations 210 and 220 sets a DPCH (Dedicated Physical Channel), which is an individual channel, between itself and each of the plurality of mobile stations 100.

In the DPCH, there are included the downlink channels 21 and 22 through which the control information is transmitted from the base stations 210 and 220 to the mobile station 100, and the uplink channels 11 and 12 through which the control signal is transmitted from the mobile station 100 to the base stations 210 and 220.

As described above, in the HSDPA, data transmission is performed from the one base station 210 by using the high-speed physical downlink shared channel 31, while the control signal is transmitted and received to and from the plurality of base stations 210 and 220 by using the DPCH (the downlink channels 21 and 22 and the uplink channels 11 and 22).

Next, there will be described the soft handover and the hard handover, which are specified by the 3GPP as handover systems.

The soft handover is a handover system by which the mobile station 100 sets up channels simultaneously with the plurality of base stations 210 and 220. The soft handover system is applied to set up the DPCH in FIG. 8.

Each of the base stations 210 and 220 transmit a common pilot signal at predetermined power. The mobile station 100 sets up the DPCH with the base station (for example, base station 210), the reception power of the common pilot signal from which is largest. However, when the difference in the reception power is small, the mobile station 100 sets up the DPCH with the other base station (for example, base station 220), the reception power of the common pilot signal from which is relatively small.

That is, the mobile station 100 is capable of simultaneously setting up the DPCH with the plurality of base stations 210 and 220. Thereby, the mobile station 100 is capable of starting communication with the other cell (base station 220) while continuing communication with the cell (base station 210 performing the data transfer) with which the mobile station 100 is currently communicating.

On the other hand, the hard handover system is applied to the high-speed physical downlink shared channel 31 relating to the data transfer.

The hard handover is a handover for switching the base station connecting with the mobile station, according to the movement of the mobile station. The hard handover results in the current radio connection being broken between the base station and the mobile station, before a new radio connection established.

Next, there will be described the transmission power control (power control for high-speed cosed loop transmission in HSDPA) in the mobile station 100, which transmission power control is performed on the basis of control signals from the respective base stations 210 and 220 in the state where the above described soft handover is applied and the base stations 210 and 220 are simultaneously connected.

FIGS. 10A and 10B are the conceptual diagrams showing a state of the high-speed cosed loop transmission power control in the HSDPA.

FIG. 10A is a figure showing a state where the DPCH is established by the soft handover between the mobile station 100 and the plurality of base stations 210 and 220, and where the high-speed physical downlink shared channel is established by the hard handover between the base station 210 and the mobile station 100.

FIG. 10B is a figure showing control signals supplied from the base stations 210 and 220 to the mobile station 100 through the downlink channels of DPCH, and showing a state where the transmission power is adjusted in the mobile station 100.

In the transmission power control of the uplink channel of DPCH, the base stations 210 and 220 measure the reception SIR (Signal to Interference Ratio) by using an individual pilot signal included in an uplink signal, and compare the measured value with a predetermined target SIR.

In the case where the measured value is smaller than the target SIR, the TPC (Transmit Power Control) bit instructing to increase the transmission power is notified to the mobile station 100 through the downlink channels (21, 22) of DPCH, and in the other case, the TPC bit instructing to reduce the transmission power is notified to the mobile station 100 through the downlink channels (21, 22) of DPCH.

The mobile station 100 receives the TPC bit, and increases or reduces the transmission power of the uplink channels (11, 12) of DPCH according to the received TPC bit.

The transmission power control of the uplink channel is performed on the basis of the TPC bits supplied from the plurality of base stations 210 and 220 connected by the soft handover.

The respective values of the TPC bits and the increase or reduction of the transmission power in the transmission power control performed in the mobile station 100 at this time are shown in FIG. 10B.

That is, when the TPC bit sent from the base station 210 to the mobile station 100 through the downlink channel 21 of DPCH instructs to increase the transmission power in the uplink channel 11 of DPCH (denoted by "up" in the figure), and when the TPC bit sent from the base station 220 to the mobile station 100 through the downlink channel 22 of DPCH instructs to increase the transmission power in the uplink channel 12 of DPCH, that is, when both the TPC bits from the base stations 210 and 220 instruct "up", the mobile station 100 increases the transmission power in the uplink channels 11 and 12 of DPCH (the transmission power of the mobile station 100 is denoted by "up" on the left end side in the figure).

On the contrary, when both the TPC bits from the base stations 210 and 220 instruct to reduce the transmission power (denoted by "down" in the figure), the mobile station 100 reduces the transmission power in the uplink channels 11 and 12 of DPCH (the transmission power of the mobile station 100 is denoted by "down" on the right end side in the figure).

On the other hand, when the TPC bit from one of the base stations 210 and 220 instructs to reduce the transmission power (denoted by "down" for the TPC bit from one of the base stations 210 and 220 in the figure), the mobile station 100 reduces the transmission power of the uplink channels 11 and 12 of DPCH (down).

As can be easily understood from the above, the mobile station 100 receives the TPC bit from each of the plurality of base stations. In the case where at least one TPC bit instructs to reduce the transmission power, the mobile station 100 reduces the transmission power in the uplink channels of DPCH. In the other case, (that is, when all the TPC bits instruct to increase the transmission power), the mobile station 100 increases the transmission power of the uplink channels of DPCH.

When the above described transmission power control is performed, the uplink channel reception quality satisfies the target SIR in one base station, and at the same time, it is prevented that the uplink channel reception quality deviates from the target SIR in all the base stations and that the interference wave power of the uplink channel is increased.

On the other hand, in the transmission power control of the downlink channels (21, 22) of DPCH, the mobile station 100 measures the reception SIR by using individual pilot signals included in the downlink channels (21, 22), and compares the measured value with a predetermined target SIR.

In the case where it is determined that the measured value is smaller than the target SIR by the comparison, the mobile station 100 transmits the TPC bit instructing to increase the transmission power to the base stations 210 and 220 through the uplink channels of DPCH. In the other case, the mobile station 100 transmits the TPC bit instructing to reduce the transmission power to the base stations 210 and 220 through the uplink channels of DPCH.

The base stations 210 and 220 increase or reduce the transmission power of the downlink channels (21, 22) of DPCH according to the above described values of the TPC bit transmitted through the uplink channels of DPCH.

Here, the DPCH of uplink channel is configured by a DPCCH (Dedicated Physical Control Channel) and a DPDCH (Dedicated Physical Data Channel). The DPCCH includes an individual pilot channel (Pilot), the TPC bit instructing to increase or reduce the transmission power, and an FBI (Feed Back Information) which is feedback information for phase adjustment in the transmit diversity.

Further, the DPDCH is data including user information and control information. The DPCCH and the DPDCH are quadrature modulated and multiplexed with each other, so as to be transmitted.

As described above with reference to FIGS. 10A and 10B, for transmission of data (that is, main information) which is an original object of communication between concerned parties (users) communicating with each other, a main information downlink channel based on the hard handover is connected between the corresponding one base station 210 and the one mobile station 100 by using a high-speed physical downlink shared channel. On the other hand, for transmission of sub-information such as the control signal as described above, downlink and uplink sub-information channels (DPCH) are connected on the basis of the soft handover.

As described with reference to FIG. 10B, in the transmission power control in the mobile station 100, even in the case where the TPC bit from the base station 210, which is a main branch connected to the high-speed physical downlink shared channel, instructs to increase the transmission power (in the figure, the TPC bit from the base station 210 is denoted by "up"), when the TPC bit from the base station 220, which is a sub-branch not connected to the high-speed physical downlink shared channel, instructs to reduce the transmission power (in the figure, the TPC bit from the base station 220 is denoted by "down"), the mobile station 100 preferentially follows the TPC bit (down) from the sub-branch, so as to reduce the transmission power of the uplink channels 11 and 12 of DPCH.

In this case, as for the communication between the mobile station 100 and the data signal transmitting base station (main branch) 210 which are connected with the high-speed physical downlink shared channel, despite the fact that the base station 210 issues a request for increasing the transmission power of the uplink channel 11 of DPCH, which request includes the FBI (feedback signal relating to transmission power control), there is caused an unbalance that an adjusting operation is performed in the direction to reduce the transmission power of the uplink channel of DPCH according to the TPC bit from the base station 220 which is not the main branch but is the sub-branch.

When the unbalance as described above is caused, the transmission is performed in the state where the FBI is transmitted to the base station 210 as the main branch with transmission power lower than the required transmission power, and hence an error is liable to occur (the bit error rate is increased). Thereby, the phase control in the transmit diversity, which is based on the FBI transmitted in this way, is abnormally performed. This eventually lowers the throughput of the transmission of data as the main information which is transmitted through the high-speed physical downlink shared channel.

FIG. 11 is a conceptual diagram showing a state of the transmit diversity in the state where the feedback information (FBI) includes an error.

Also in FIG. 11, similarly to the transmit diversity shown in FIG. 6 and FIG. 7, known signals transmitted as the signals TS1 and TS2 from two antennas (not shown) reach the mobile station (not shown) as the signal RS1 and the signal RS2 through the radio space which is the propagation path. The signal RS1 and the signal RS2 are synthesized in the mobile station, so that a prescribed diversity combining gain is (originally) obtained.

As described above, in the open loop transmit diversity, the amount of phase rotation in the radio propagation path is separately culculated in the mobile station for each transmission antenna, and the feedback information requiring that the signals TS1 and TS2 be transmitted as signals with phases shifted beforehand from each antenna on the basis of the culculated result is transmitted from the mobile station to the base station.

However, when the unbalance in the transmission power control is caused as described above, the erroneous feedback information itself is transmitted to the base station. Hence, on the side of the base station which receives the erroneous feedback information, the phase difference between TS1 and TS2 is erroneously set according to the erroneous feedback information.

Thus, the signals TS1 and TS2 having such unsuitable phase difference propagate in the radio space and reach the mobile station as the signal RS1 and the signal RS2. Thereby, the phases of the signal RS1 and the signal RS2 which reach the mobile station are not coincident with each other, so as to cause the diversity combining gain to be deviated.

When the cosed loop transmit diversity is in the state as described with reference to FIG. 11, there is caused, as described above, the problem that the throughput relating to the transmission of data as the main information transmitted through the high-speed physical downlink shared channel is eventually lowered.

In order to solve such problem, it is only necessary to reduce the generation of error in the transmission of feedback information by increasing the transmission power of the uplink channel of DPCH.

However, when the transmission power of the uplink channel of DPCH is unconditionally increased, the transmission power of the uplink channels of DPCH is increased more than needed. This results in a new problem that the power consumption of the mobile station is increased and that the interference wave power of the uplink channels is increased.

There has already been proposed a technique which reduces the generation of error in the transmission of feedback information by controlling the transmission power of the uplink channel of DPCH, while coping with such problem (please refer to JP2004-80235A (please refer to paragraph 0021 to paragraph 0025, and the like, and hereinafter referred to as Patent Document 1), JP2004-7030A (please refer to paragraph 0021 to paragraph 0027, paragraph 0021 to paragraph 0028, and the like, and hereinafter referred to as Patent Document 2), and the like).

In Patent Document 1 and Patent Document 2, there is disclosed a technique in which the transmission power control of an individual uplink channel is performed only on the basis of the transmission power control information included in an individual downlink channel from a packet transmitting base station.

In the technique disclosed in Patent Document 1 and Patent Document 2, in other words, when the data of main information is received from the main branch, the transmission power control is performed only in accordance with the TPC bit transmitted through the downlink control channel from the main branch, and without the influence of the TPC bit transmitted from the base station serving as the sub-branch.

On the other hand, in these days, in order to maintain the communication quality at a high level, the base stations are installed in various places. For this reason, it is not rare that the base station is particularly installed in places, such as an indoor place, and a station yard, where the installation space cannot be sufficiently secured all the time.

In the base station installed in such extremely limited space, it is not necessarily permitted to adopt a relatively large type base station which is provided with a plurality of antennas to perform the transmit diversity, and hence the cosed loop transmit diversity is not necessarily applied.

However, in the case where it is assumed that the technique as disclosed in Patent document 1 and Patent document 2 is simply applied in such actual state, the transmission power control is indiscriminately performed only in accordance with the TPC bit transmitted through the downlink control channel from the main branch at the time when the data of main information is received from the main branch.

However, in the state where the above described cosed loop transmit diversity is not performed, the phase adjustment in the transmit diversity is not principally performed on the basis of the feedback information. Thus, this state is essentially independent of the process in which the error of the feedback information itself is suppressed.

Even in this state, when it is configured such that the transmission power control of the uplink control channel is indiscriminately performed only according to the TPC bit transmitted through the downlink control channel from the main brunch at the time when the data of main information is received from the main brunch, the control on the side of the mobile station is performed such that the transmission power of the uplink control channel is unconditionally increased, as long as the TPC bit transmitted through the downlink control channel instructs to increase the transmission power. This may result in a case where the power is uselessly consumed.

Usually, one of the greatest demands for the mobile station which is driven by a battery and has a limited power supply capacity, is to suppress the power consumption as much as possible, and to thereby secure the continuous operation time after charging as long as possible. Therefore, it is a very important technical problem to suppress the useless power consumption as described above.

However, in Patent Document 1 and Patent Document 2, such actual technical problem is not considered in particular, and hence no solution for the problem is naturally disclosed and suggested.

The present invention has been made in view of the above described circumstances. An object of the present invention is to provide a mobile station and a transmission power control method in the mobile station, which make it possible to improve a power saving characteristic associated with transmission power control in the mobile station under a condition in which the transmit diversity is applied.

SUMMARY OF THE INVENTION

According to one aspect of the present invention, a mobile station which is configured enabling to receive main information, which is set as an object of communication between users, through a main information downlink channel from one corresponding base station, and enabling to receive first sub-information representing a perticipant for maintaining a communication state, through sub-information downlink channels from a plurality of base stations including the one base station, and is configured enabling to transmit second sub-information representing a perticipant for maintaining the communication state, through sub-information uplink channels to the plurality of base stations including the one base station.

The mobile station according to the present invention includes:

a communication method determining section configured to determine whether or not a cosed loop transmit diversity can be applied, which cosed loop transmit diversity is configured, according to a state of synthesized sub-information obtained by receiving and combining the first sub-information transmitted by using different antennas from a base station performing communication with the mobile station in one specific area, to generate the second sub-information including feedback information for making the base station control the transmission of the first sub-information to maintain quality associated with the reception of the first sub-information, and is configured to transmit the generated second sub-information to the side of the base station;

a communication base station determining section configured to determine whether or not the sub-information downlink channels and the sub-information uplink channels are connected to the plurality of base stations; and a transmission power control section configured to control the transmission power of the sub-information uplink channel only on the basis of the first sub-information from the base station connected to the main information downlink channel, when it is determined by the communication method determining section that the cosed loop transmit diversity can be applied, and when it is determined by the communication base station determining section that the sub-information downlink channels and the sub-information uplink channels are connected to the plurality of base stations.

The above described mobile station is configured enabling to receive main information, such as packetized data, which is set as an object of communication between users, from one corresponding base station through a main information downlink channel, and enabling to receive first sub-information, such as for example control information, representing a perticipant for maintaining a communication state, from a plurality of base stations including the one base station through sub-information downlink channels, and is configured enabling to transmit second sub-information, such as for example control information, representing a perticipant for maintaining the communication state, to the plurality of base stations including the one base station through sub-information uplink channels.

In the above described mobile station, the transmission power of the sub-information uplink channel is controlled only on the basis of the first sub-information from the base station connected to the main information downlink channel, only in the case where it is determined by the communication method determining section that a cosed loop transmit diversity can be applied, which cosed loop transmit diversity is configured, according to a state of synthesized sub-information obtained by receiving and combining the first sub-information transmitted from the side of the base station by using different antennas, to generate the second sub-information including feedback information for making the base station control the transmission of the first sub-information to maintain the quality associated with the reception of the first sub-information, and is configured to transmit the generated second sub-information to the side of the base station, and where it is determined by the communication base station determining section that the sub-information downlink channels and the sub-information uplink channels are connected to the plurality of base stations.

For this reason, only in the case where it is determined that the cosed loop transmit diversity is performed and that the connection with the plurality of base stations is effected, that is, where the feedback information is effectively used for controlling the transmission state, the transmission power of the sub-information uplink channel is controlled only on the basis of the first sub-information from the base station connected to the main information downlink channel.

Therefore, it is possible to avoid the problem that as in the conventional technique, when the main information downlink channel is connected, the transmission power of the sub-information uplink channel is indiscriminately controlled so as to be uselessly increased only on the basis of the first sub-information from the base station, without regard to whether or not the feedback information is effective, and that thereby the power is uselessly consumed. As a result, the power saving characteristic of the mobile station can be improved.

Further, the above described mobile station can be configured enabling to receive transmission data corresponding to the main information through a downlink data channel corresponding to the main information downlink channel of a communication system based on the HSDPA.

When the mobile station is configured in this way, it is possible to improve the power saving characteristic in the mobile station in the communication based on the HSDPA proposed by the 3GPP.

Further, the above described mobile station can be configured enabling to receive the first sub-information, in which the transmission power control information is included, through a downlink control channel corresponding to the sub-information downlink channel.

When the mobile station is configured in this way, it is possible to perform an excellent transmit diversity and to improve the power saving characteristic of the mobile station in the communication, or the like, based on the HSDPA proposed by, for example, the 3GPP.

Further, the above described mobile station can be configured enabling to transmit the second sub-information, in which phase correction information of the main information is included, through an uplink control channel corresponding to the sub-information uplink channel.

When the mobile station is configured in this way, an excellent transmit diversity is performed by suitably performing the phase adjustment on the basis of the FBI of the control channel in the communication, or the like, based on the HSDPA proposed by, for example, the 3GPP, and the power saving characteristic in the mobile station can be improved.

According to another aspect of the present invention, a transmission power control method in a mobile station, which is configured enabling to receive main information, set as an object of communication between users, from one corresponding base station through a main information downlink channel on the basis of the hard handover, and enabling to receive first sub-information representing a perticipant for maintaining a communication state, from a plurality of base stations including the one base station through sub-information downlink channels on the basis of the soft handover, and is configured enabling to transmit second sub-information representing a perticipant for maintaining the communication state, to the plurality of base stations including the one base station through sub-information uplink channels on the basis of the soft handover, the transmission power control method including:

a first step of determining whether or not a cosed loop transmit diversity can be applied, which cosed loop transmit diversity is configured, according to a state of synthesized sub-information obtained by receiving and combining the first sub-information transmitted by using different antennas from a base station performing communication with the mobile station in one specific area, to generate the second sub-information including feedback information for making the base station control transmission of the first sub-information to maintain quality associated with the reception of the first sub-information, and is configured to transmit the generated second sub-information to the side of the base station;

a second step of determining whether or not the sub-information downlink channels and the sub-information uplink channels are connected to the plurality of base stations; and a third step of controlling the transmission power of the sub-information uplink channel only on the basis of the first sub-information from the base station connected to the main information downlink channel, when it is determined in the first step that the cosed loop transmit diversity can be applied, and when it is determined in the second step that the sub-information downlink channels and the sub-information uplink channels are connected to the plurality of base stations.

In the above described transmission power control method, a mobile station is configured enabling to receive main information, such as packet data, set as an object of communication between users, from one corresponding base station through a main information downlink channel on the basis of the hard handover, and enabling to receive first sub-information, such as for example control information, representing a perticipant for maintaining a communication state, from a plurality of base stations including the one base station through sub-information downlink channels on the basis of the soft handover, and is configured to transmit second sub-information, such as for example control information, representing a participant for maintaining the communication state, to the plurality of base stations including the one base station through sub-information uplink channels on the basis of the soft handover.

The mobile station determines in the first step whether or not a cosed loop transmit diversity can be applied, which cosed loop transmit diversity is configured, according to a state of synthesized sub-information obtained by receiving and combining the first sub-information transmitted by using different antennas from the side of a base station performing communication with the mobile station in one specific area, to generate the second sub-information including feedback information for making the base station control the transmission of the first sub-information to maintain the quality associated with the reception of the first sub-information, and is configured to transmit the generated second sub-information to the side of the base station, determines in the second step whether or not the sub-information downlink channels and the sub-information uplink channels are connected to the plurality of base stations, and controls in the third step the transmission power of the sub-information uplink channel only on the basis of the first sub-information from the base station connected to the main information downlink channel, when the determination results in both the first step and the second step are affirmative.

For this reason, only in the case where the cosed loop transmit diversity is performed and the connection with the plurality of base stations is effected, that is, where the feedback information is effectively used for controlling the transmission state, the transmission power of the sub-information uplink channel is controlled only on the basis of the first sub-information from the base station which is connected to the main information downlink channel on the basis of the hard handover.

Therefore, it is possible to avoid the problem that as in the conventional technique, when the main information downlink channel is connected, the transmission power of the sub-information uplink channel is indiscriminately controlled so as to be uselessly increased, only on the basis of the first sub-information from the base station, without regard to whether or not the feedback information is effective, and without regard to the signal from the other base station connected on the basis of the soft handover, and that thereby the power is uselessly consumed. As a result, the power saving characteristic of the mobile station can be improved.

As mentioned above, it is possible to maintain a state where the cosed loop transmit diversity effectively functions, and also possible to improve the power saving characteristic associated with the transmission power control in a mobile station.

Other objects and features will be clarified from the following description with reference to the attached drawings.

DETAILED DESCRIPTION OF THE PREFERRED EMBODIMENTS

In the following, the present invention will be described with reference to the accompanying drawings.
(Configuration of a Mobile Station as an Embodiment According to the Present Invention)

Figure 1:
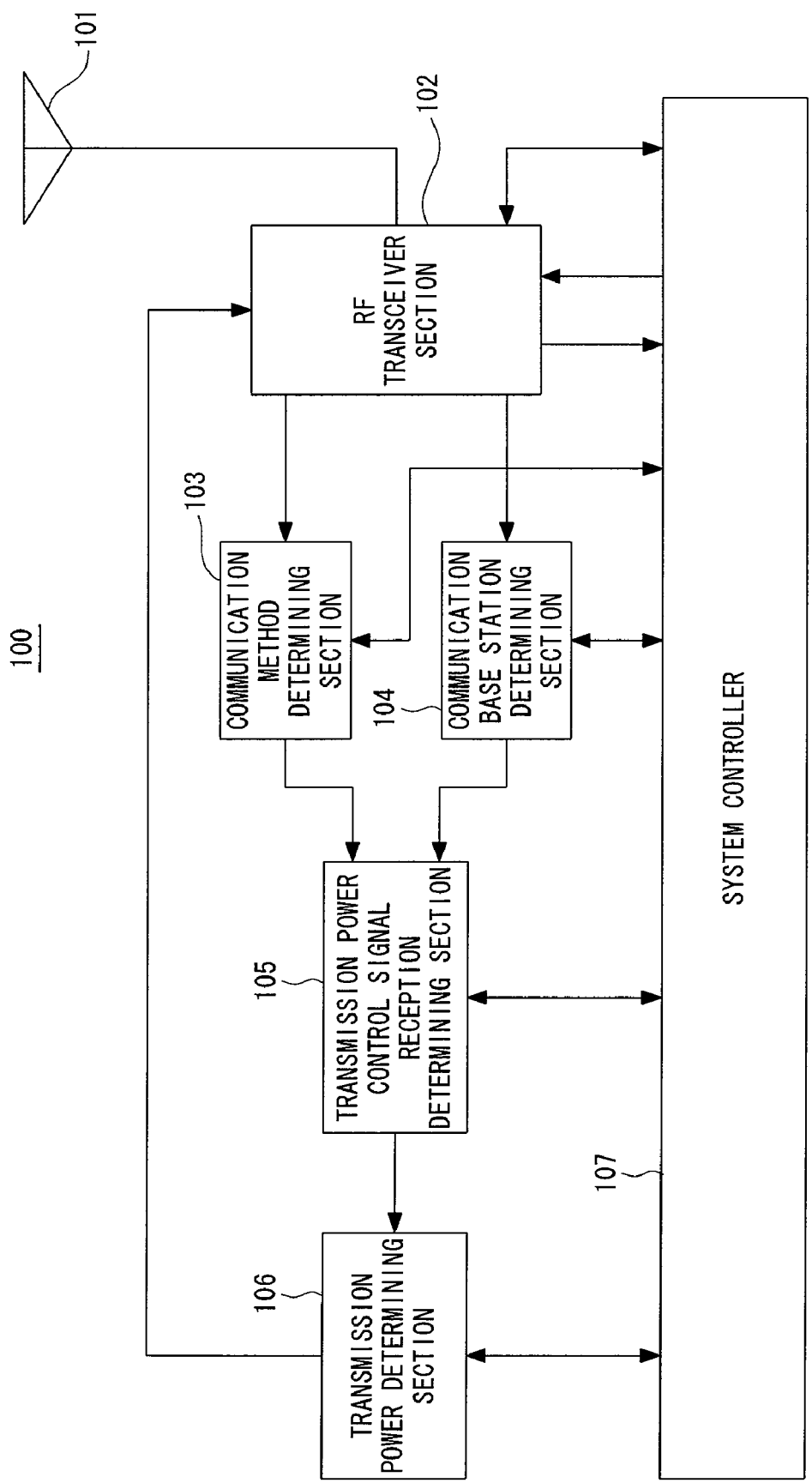
FIG. 1 is a functional block diagram showing a configuration of a mobile station as an embodiment according to the present invention.

FIG. 1 is a functional block diagram showing a configuration of a mobile station as an embodiment according to the present invention.

In FIG. 1, a mobile station 100 complies with a communication system based, for example, on the HSDPA. The mobile station 100 can take the same form as a conventional mobile station of this type, as long as the mobile station 100 is configured enabling to receive main information (such as, for example, packet data), set as an object of communication between users, from a corresponding one base station through a main information downlink channel (downlink data channel), which can be the HS-PDSCH or the like, and enabling to receive first sub-information (such as, for example, control information through downlink channels of DPCH) representing a perticipant for maintaining a communication state, from a plurality of base stations including the one base station through sub-information downlink channels (downlink control channels), and is configured enabling to transmit second sub-information (such as, for example, control information of uplink channels of DPCH) which is information representing a perticipant for maintaining the communication state and can take a form to include phase correction information of the main information, to the plurality of base stations including the one base station through sub-information uplink channels (uplink control channels).

The mobile station 100 performs radio communication with the respective base stations (not shown) through an antenna 101.

The antenna 101 is commonly used for transmission and reception by an antenna sharing circuit (Duplexer) provided in a RF transceiver section 102 which performs transmission and reception processing relating to RF signals.

The RF transceiver section 102 includes respective function sections which are known per se and perform amplification, frequency conversion, demodulation, modulation, and the like (any of which is configured in the RF transceiver section 102, but not shown), and is configured such that the each processing is performed at a predetermined timing in the respective function sections.

The demodulation output from the demodulation function section is separated by a channel separation circuit (configured in the RF transceiver section 102) into user information (such as, for example, packet data) as the main information set as an object of communication between users, and the various control information as sub-information (which corresponds to the first sub-information, and is transmitted through the downlink channel of DPCH as described above) representing a perticipant for maintaining a communication state.

The first sub-information is supplied to a communication method determining section 103 and a communication base station determining section 104, respectively.

The communication method determining section 103 determines whether or not a cosed loop transmit diversity can be applied, which cosed loop transmit diversity is configured, according to a state of synthesized sub-information obtained by receiving and combining the first sub-information transmitted by using different antennas from a base station performing communication with the mobile station in one specific area, to generate the second sub-information including feedback information for making the base station control transmission of the first sub-information to maintain quality associated with the reception of the first sub-information, and is configured to transmit the generated second sub-information to the side of the base station (transmit through, for example, an uplink channel of DPCH).

Further, when it is determined by the communication method determining section 103 that the above described cosed loop transmit diversity can be applied, the communication base station determining section 104 determines whether or not the sub-information downlink channels and the sub-information uplink channels are connected to the plurality of base stations. This determination is performed, for example, on the basis of a result of counting the number of base stations with which the above described connection is effected.

Output data representing the determination results in the communication method determining section 103 and the communication base station determining section 104 are supplied to a transmission power control signal reception determining section 105.

In the transmission power control signal reception determining section 105, according to the number of the base stations as connection destination, which number is recognized from the output data of the communication base station determining section 104, a control signal from the each base station is identified, and a transmission power control signal (for example, a signal taking a form of the TPC bit as described above) for the each corresponding base station is received.

Further, when it is determined, on the basis of the output data of the communication method determining section 103, that the cosed loop transmit diversity can be applied at the present time, and when it is recognized, on the basis of the output data of the communication base station determining section 104, that the connection with a plurality of base stations is effected, the transmission power control signal reception determining section 105 determines only the transmission power control signal (for example, the TPC bit) transmitted from the data transmitting base station (main branch) which is the one base station connected by the main information downlink channel for transmitting the main information, as a control instruction on which the transmission power control of the uplink sub-information channel is to be based when it is performed, and supplies the transmission power control signal coincident with the determination result to a transmission power determining section 106.

The transmission power determining section 106 determines a value of transmission power of the uplink sub-information channel on the basis of the transmission power control signal supplied from the transmission power control signal reception determining section 105.

The determination result is supplied to the RF transceiver section 102, so that the RF transceiver section 102 performs an adjusting operation of transmission power by using the supplied determination result as a target value in the transmission power control of the uplink sub-information channel.

In the mobile station 100 according to the present embodiment, there is provided a system controller 107 which totally manages the whole system including the RF transceiver section 102, the communication method determining section 103, the communication base station determining section 104, the transmission power control signal reception determining section 105, and the transmission power determining section 106.

The system controller 107 receives an operation of a user from an operation section (not shown) including an operation button, and the like, and performs required operations relating to the communication. Further, the system controller 107 displays or voice-outputs to the user the received information which is demodulated in the RF transceiver section 102, and also supplies to the RF transceiver section 102 information to be transmitted.

The above described required operations relating to the communication include operations, such as those for monitoring and controlling the progress of processing in the RF transceiver section 102, the communication method determining section 103, the communication base station determining section 104, the transmission power control signal reception determining section 105 and the transmission power determining section 106 (including adjustment of mutual operation timings, and the like).

The operation sequence of the transmission power control in the mobile station 100, as will be described below with reference to a flow chart, is also successively performed under the total management by the system controller 107.

Note that the transmission power control section which, when it is determined by the communication base station determining section 104 that the sub-information downlink channels and the sub-information uplink channels are connected to the plurality of base stations, controls the transmission power of the sub-information uplink channel only on the basis of the first sub-information from the base station connected to the main information downlink channel, is configured by including the transmission power control signal reception determining section 105, the transmission power determining section 106, a corresponding part of the RF transceiver section 102, and a corresponding function part of the system controller 107.

(Transmission Power Control Operation in the Mobile Station as the Embodiment According to the Present Invention)

Figure 2:
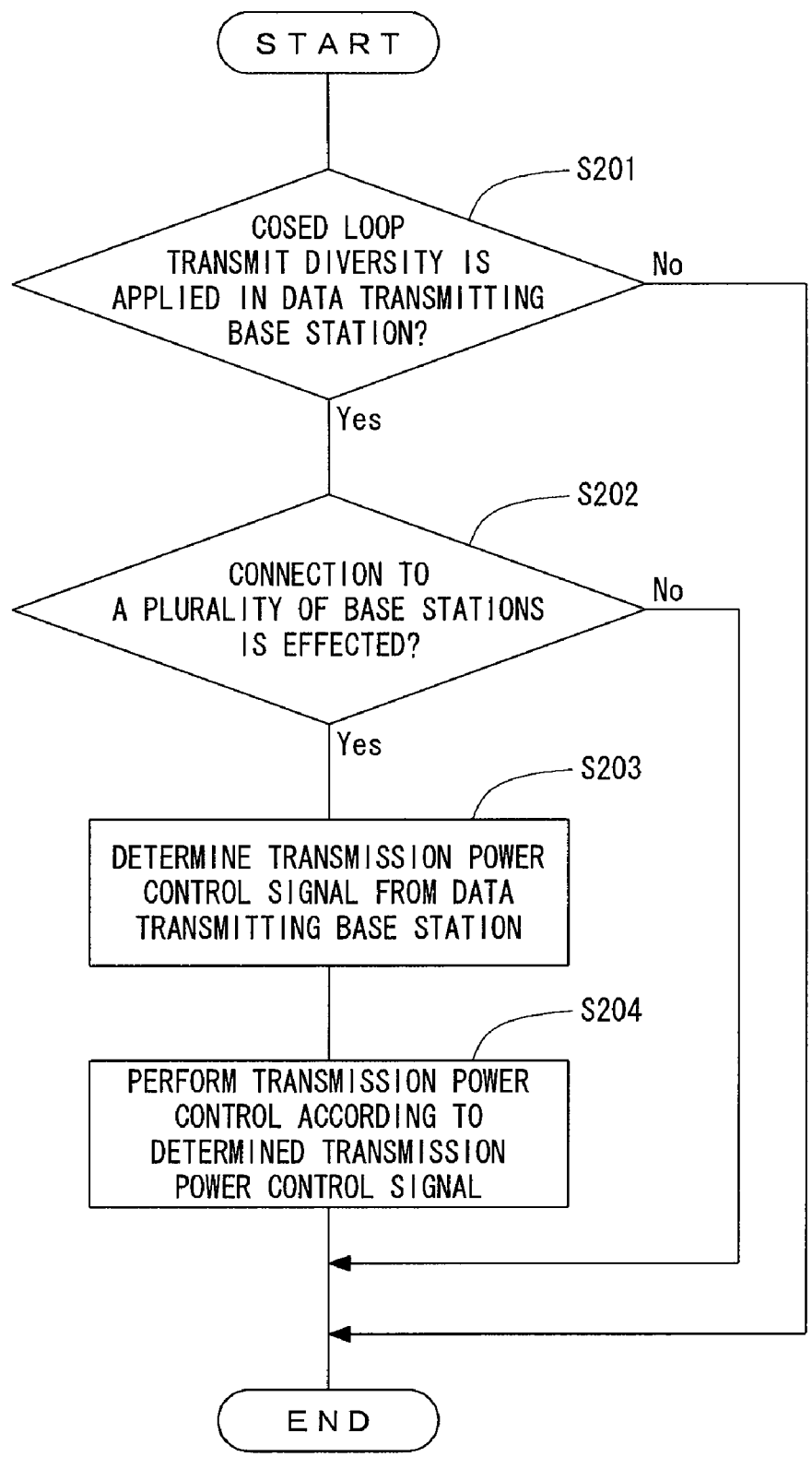
FIG. 2 is a flow chart showing a transmission power control operation in the mobile station shown in FIG. 1.

FIG. 2 is a flow chart showing a transmission power control operation in the mobile station shown in FIG. 1.

First, the communication method determining section 103 determines whether or not a cosed loop transmit diversity can be applied, which cosed loop transmit diversity is configured, according to a state of synthesized sub-information obtained by receiving and combining first sub-information transmitted by using different antennas from a base station performing communication with the mobile station in one specific area, to generate second sub-information including feedback information for making the base station control the transmission of the first sub-information to maintain quality associated with the reception of the first sub-information, and is configured to transmit the generated second sub-information to the side of the base station (transmit, for example, through an uplink channel of DPCH) (step S201).

When it is determined in step S201 that the above described cosed loop transmit diversity can be applied (step S201: Yes), the communication base station determining section 104 determines whether or not sub-information downlink channels and sub-information uplink channels are connected to a plurality of base stations (step S202).

When it is determined in step S202 that the sub-information downlink channels and the sub-information uplink channels are connected to the plurality of base stations (step S202: Yes), the transmission power control signal reception determining section 105 determines only a transmission power control signal (for example, the TPC bit) transmitted from a data transmitting base station (main branch) which is one base station connected to a main information downlink channel and transmits main information, as a control instruction on which the transmission power control of the uplink sub-information channel is based when it is performed (step S203).

The transmission power control signal determined as described above in step S203 is supplied to the transmission power determining section 106 as a signal for determining a value of transmission power of the uplink sub-information channel. The transmission power determining section 106 determines the value of transmission power of the uplink sub-information channel on the basis of the transmission power control signal supplied in this way, and supplies the determined value of transmission power to the RF transceiver section 102, so that the determined value is used in an adjusting operation of transmission power in the RF transceiver section 102 (step S204).

Note that when it is determined in step S201 that the above described cosed loop transmit diversity cannot be applied (step S201: No), and when it is determined in step S202 that the sub-information downlink channels and the sub-information uplink channels are not connected to the plurality of base stations (step S202: No), the above describe cosed loop transmit diversity is not applied, and the transmission power control in a known form is continued as in the ordinary communication system of this type.

As described above, in the transmission power control operation described with reference to FIG. 2, even when the order of the processing in step S201 and step S202 is exchanged, there is no problem in the processing performed in the subsequent steps. Next, this example will be shown as a modification.

Figure 3:
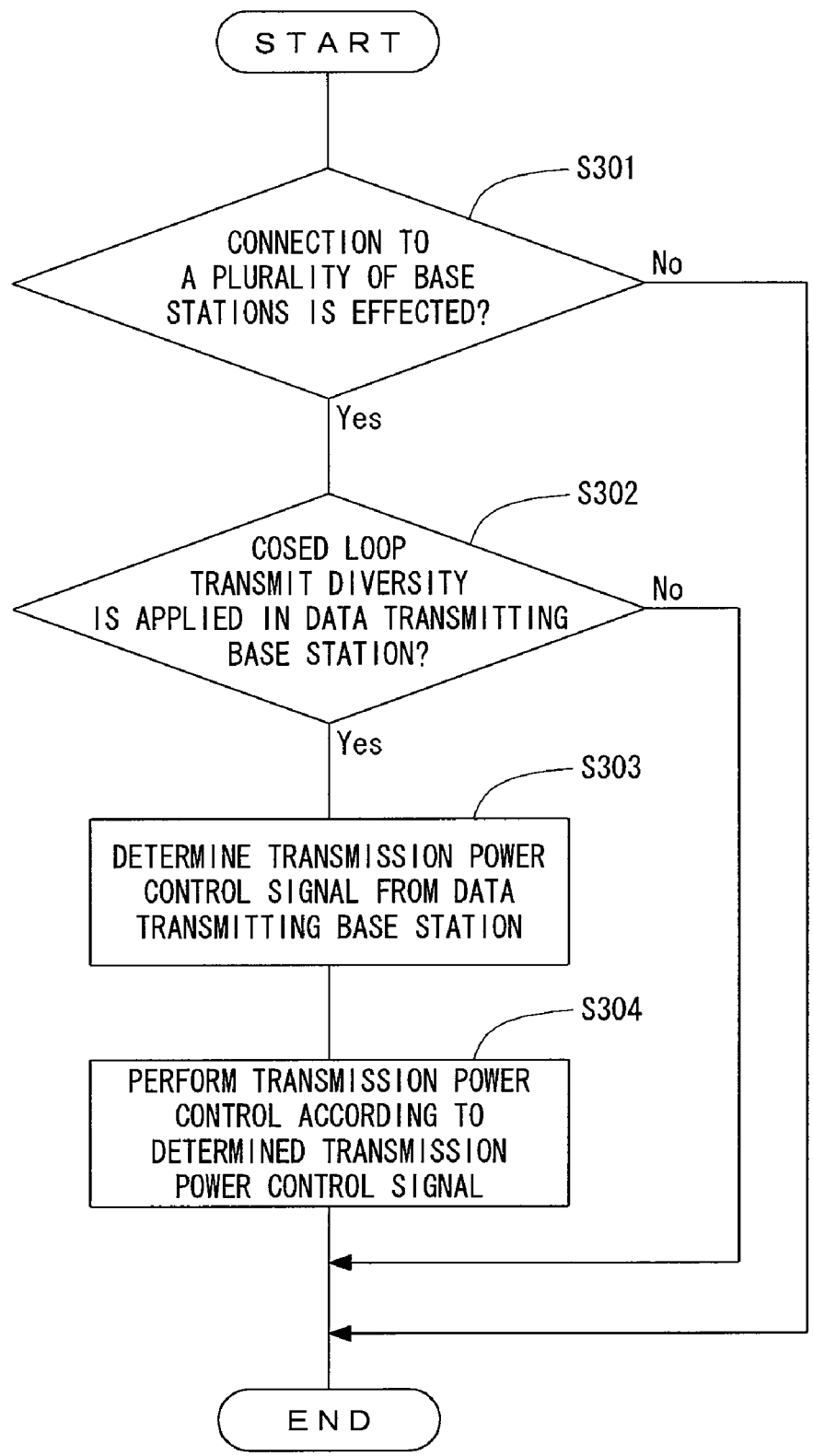
FIG. 3 is a flow chart showing a modification of the flow chart shown in FIG. 2.

FIG. 3 is a flow chart showing the modification according to FIG. 2.

First, it is determined by the communication base station determining section 104 whether or not sub-information downlink channels and sub-information uplink channels are connected to a plurality of base stations (step S301).

When it is determined in step S301 that the sub-information downlink channels and the sub-information uplink channels are connected to the plurality of base stations (step S301: Yes), it is subsequently determined by the communication method determining section 103 whether or not a cosed loop transmit diversity can be applied, which cosed loop transmit diversity is configured, according to a state of synthesized sub-information obtained by receiving and combining first sub-information transmitted by using different antennas from a base station performing communication with a mobile station in one specific area, to generate second sub-information including feedback information for making the base station control the transmission of the first sub-information to maintain quality associated with the reception of the first sub-information, and is configured to transmit the generated second sub-information to the side of the base station (transmit, for example, through an uplink channel of DPCH) (step S302).

When it is determined in step S302 that the above described cosed loop transmit diversity can be applied (step S302: Yes), the transmission power control signal reception determining section 105 determines only a transmission power control signal (for example, the TPC bit) transmitted from the data transmitting base station (main branch) which is one base station connected to the main information downlink channel and transmits the main information, as a control instruction on which the transmission power control of the uplink sub-information channel is based when it is performed (step S303).

The transmission power control signal determined as described above in step S303 is supplied to the transmission power determining section 106 as a signal for determining a value of transmission power of the uplink sub-information channel. The transmission power determining section 106 determines the value of transmission power of the uplink sub-information channel on the basis of the transmission power control signal supplied in this way and supplies the determined value of transmission power to the RF transceiver section 102, so that the determined value is used in an adjusting operation of transmission power in the RF transceiver section 102 (step S304).

Note that when it is determined in step S301 that the sub-information downlink channels and the sub-information uplink channels are not connected to the plurality of base stations (step S301: No), and when it is determined in step S302 that the above described cosed loop transmit diversity cannot be applied (step S302: No), the above describe cosed loop transmit diversity is not applied, and the transmission power control in a known form is continued as in the ordinary communication system of this type.

As described above, the transmission power control in the mobile station described with reference to FIG. 1, FIG. 2, and FIG. 3 is effectively applied to the communication for performing data transfer by using a shared channel, as in the HSDPA proposed by the 3GPP.

In this case, the main information (such as packet data), which is set as an object of communication between users, is transmitted from the corresponding one base station to the mobile station through the main information downlink channel on the basis of the hard handover. The first sub-information and the second sub-information, as described above, are transmitted and received to and from the plurality of base stations including the one base station through the sub-information downlink channels and the sub-information uplink channels on the basis of the soft handover.

(Increase and Reduction of Transmission Power in the Mobile Station as the Embodiment According to the Present Invention)

Figure 4:
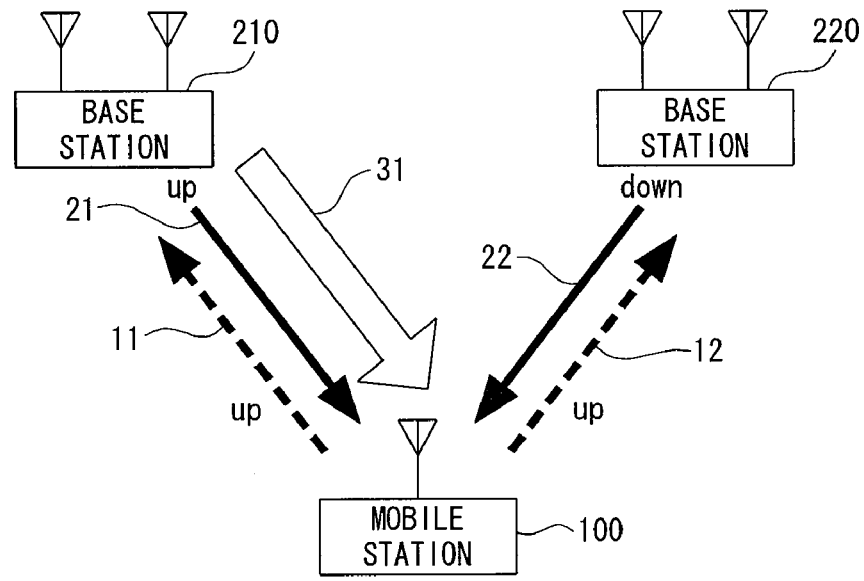
FIG. 4 is a conceptual diagram showing a state in the case of the transmission power control in the mobile station explained with reference to FIG. 1, FIG. 2, and FIG. 3.
Figure 5:
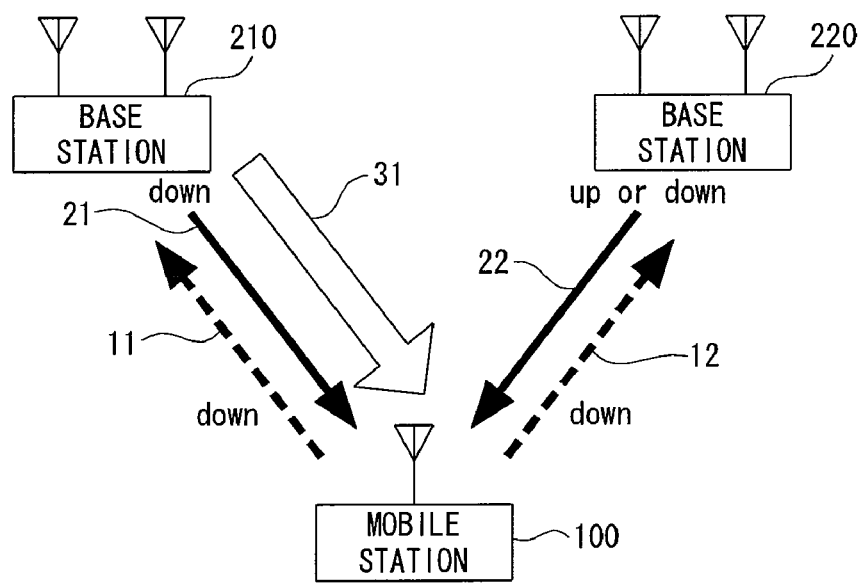
FIG. 5 is a conceptual diagram showing a state in another case of the transmission power control in the mobile station explained with reference to FIG. 1, FIG. 2, and FIG. 3.
Figure 6:
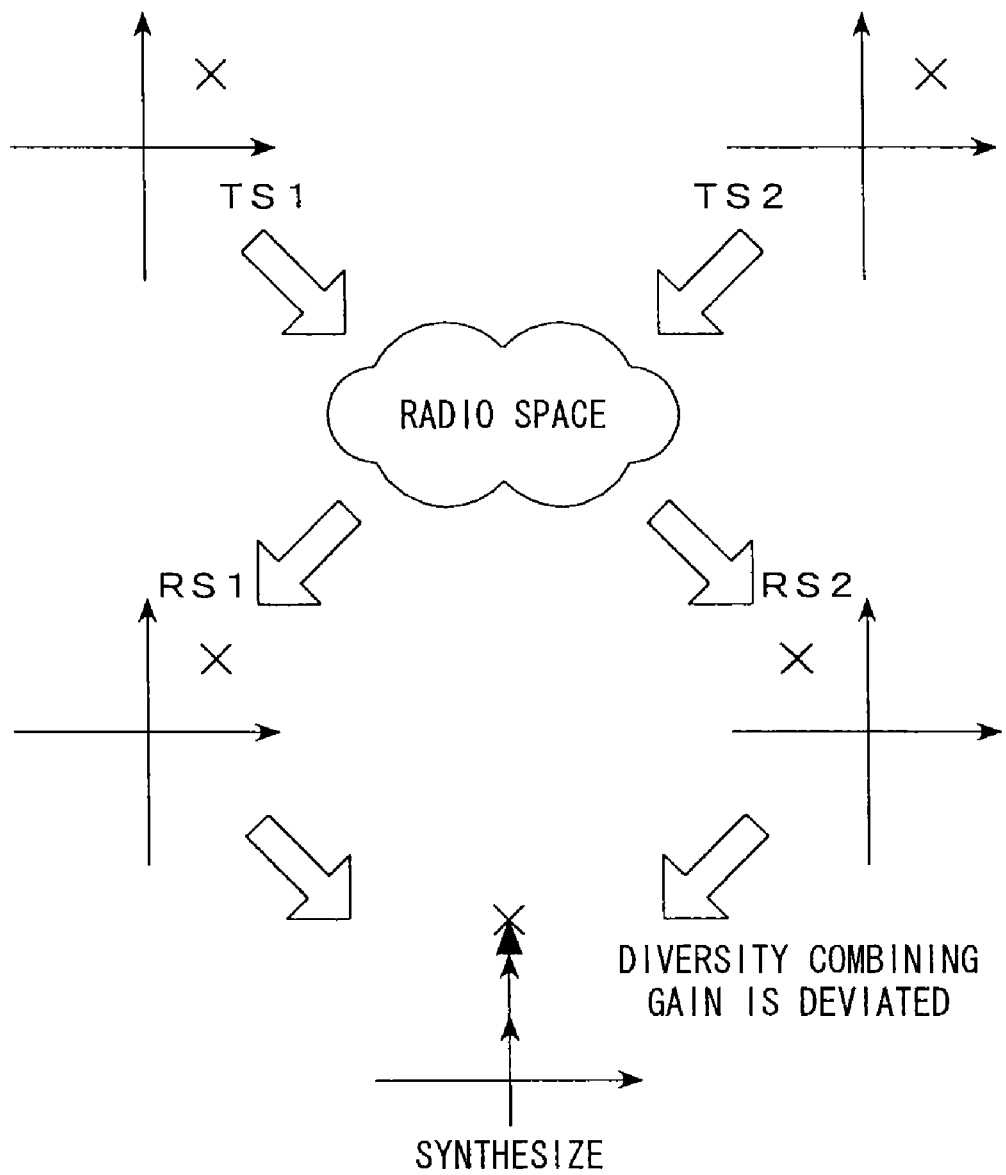
FIG. 6 is a conceptual diagram for explaining phase states in the case of adopting an open loop transmit diversity in which feedback information from the mobile station is not used.
Figure 7:
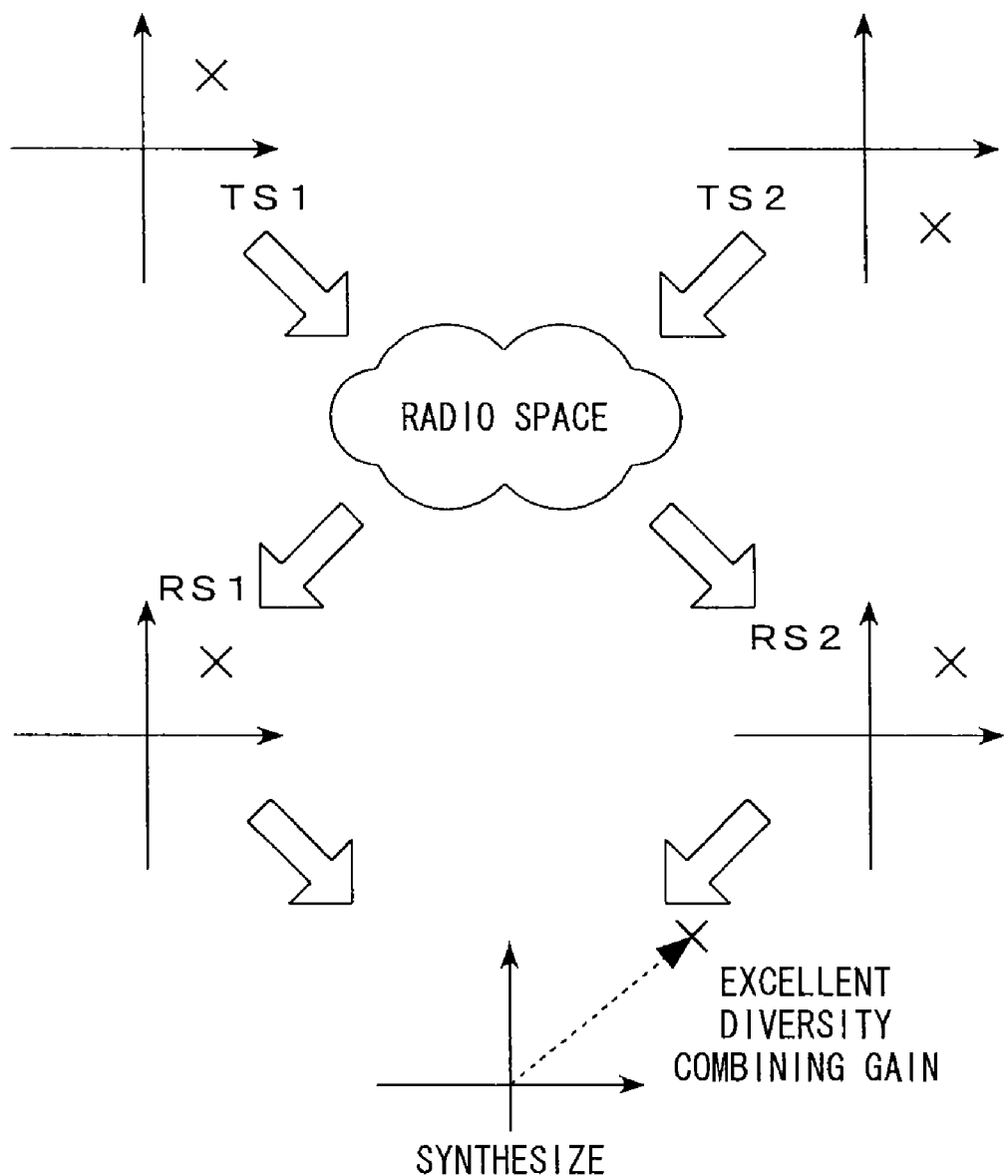
FIG. 7 is a conceptual diagram for explaining phase states in the case of adopting a cosed loop transmit diversity which controls the phase and the like of transmission signals on the basis of the feedback information transmitted from the mobile station.
Figure 8:
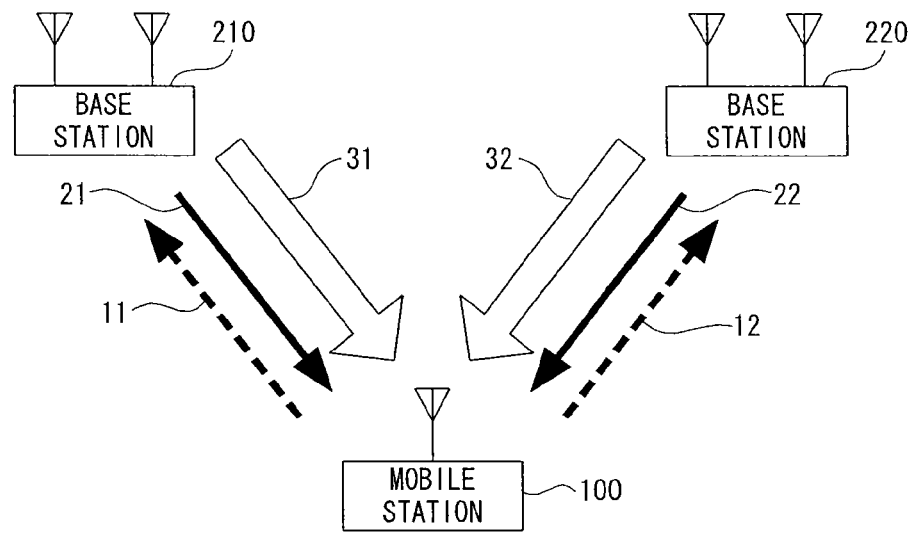
FIG. 8 is a conceptual diagram showing a state of communication in which conventional individual channels are used.

FIG. 4 and FIG. 5 are conceptual diagrams which represent a state of transmission power control in the mobile station described with reference to FIG. 1, FIG. 2, and FIG. 3 (for example, when the main information such as packet data is transmitted by the HSDPA).

Figure 9:
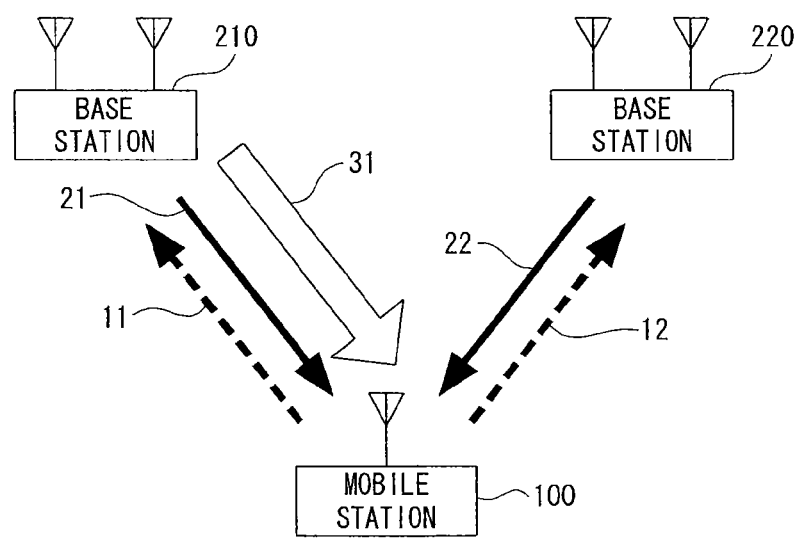
FIG. 9 is a conceptual diagram showing a state of communication in which data transfer is performed using a shared channel.
Figures 10A, 10B:
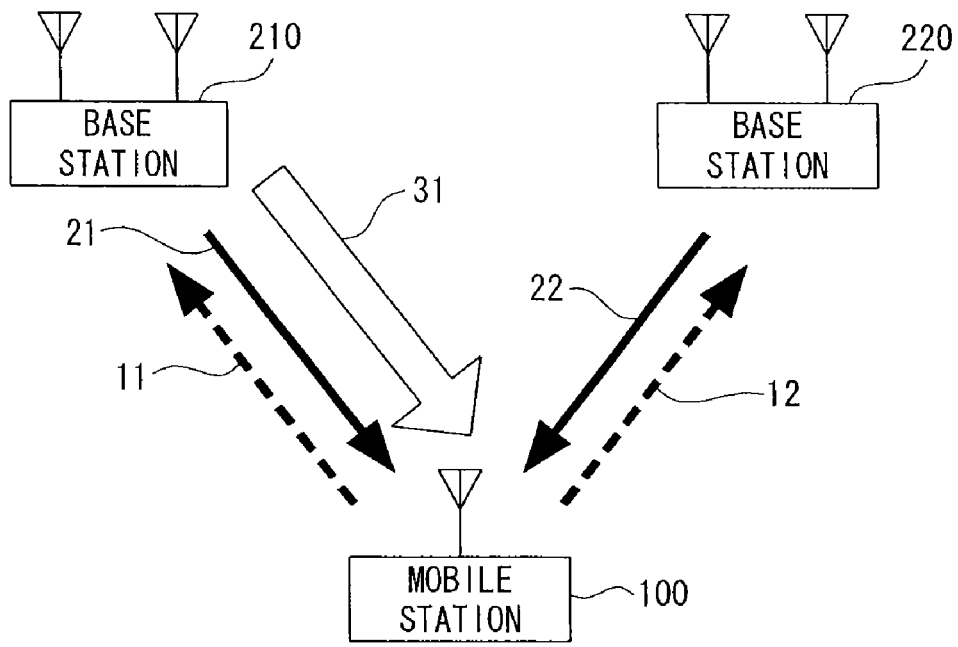
FIGS. 10A and 10B are the conceptual diagrams showing a state of high-speed cosed loop transmission power control in the HSDPA.
Figure 11:
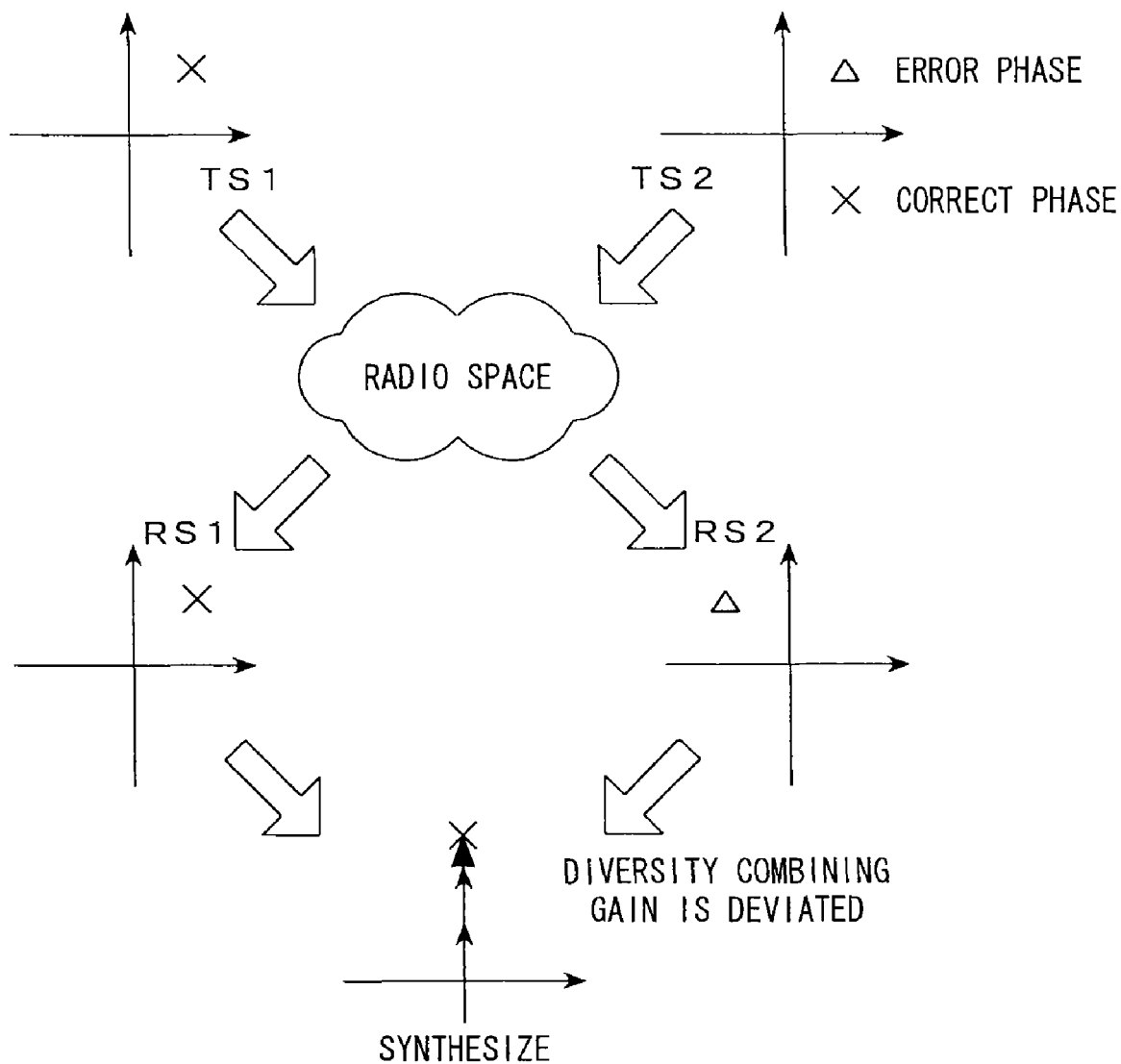
FIG. 11 is a conceptual diagram showing a state of a transmit diversity in a state where there is an error in the feedback information.

In FIG. 4 and FIG. 5, sections corresponding to those in FIG. 9 and FIGS. 10A and 10B are denoted by the same reference numerals.

As described above, in the HSDPA, a high-speed physical downlink shared channel 31 (HS-PDSCH) is used as a downlink channel used for transmission of the information (data) from base stations 210 and 220 to a mobile station 100.

The base stations 210 and 220 determine a schedule on which data transmission is performed to each of the plurality of mobile stations 100 (for convenience of explanation, only one station is shown in FIG. 4 and FIG. 5), and transfer data so that the transfer timing is made different for each of the mobile stations 100.

In the HSDPA, each of the base stations 210 and 220 sets up the above described DPCH which is an individual channel connected to each of the plurality of mobile stations 100.

In the DPCH, the control information is transmitted from the base stations 210 and 220 to the mobile stations 100 through downlink channels 21 and 22, and control signals (TPC and FBI) are transmitted from the mobile stations 100 to the base stations 210 and 220 through uplink channels 11 and 12.

In the state of FIG. 4, as for the data transfer, the data is transmitted from one base station 210 through the high-speed physical downlink shared channel 31 on the basis of the hard handover, while as for control signal transfer, the control signal is transmitted and received to and from the plurality of base stations 210 and 220 through the DPCH (downlink channels 21 and 22 and uplink channels 11 and 12) on the basis of the soft handover.

There is assumed the case where the TPC bit (up) which instructs to increase the transmission power is sent from the base station 210 through the downlink channel 21 of DPCH, and at the same time, the TPC bit (down) which instructs to reduce the transmission power is sent from the base station 220 through the downlink channel 22.

In this case, in the mobile station 100 according to the present embodiment, when it is recognized that the cosed loop transmit diversity can be applied between the mobile station 100 and the base station 210 and that the mobile station 100 is connected to the plurality of base stations 210 and 220, then the mobile station 100 does not preferentially follow the TPC bit (down) which is sent from the base station 220 (sub-branch in the figure) and instructs to reduce the transmission power, unlike the case of the conventional apparatus shown in FIG. 10B, but performs the transmission power control so as to increase the transmission power of the uplink channel 11 of DPCH according to the TPC bit (up) which is sent from the base station 210 (main branch in the figure) and instructs to increase the transmission power.

Thus, the transmission power of the uplink channel of DPCH relating to the main branch is suitably controlled, so that the generation of error in the transmission of feedback information can be reduced, and the throughput relating to the main information transfer can be maintained at a high level.
(Feature in the Comparison Between the Mobile Station as the Embodiment According to the Present Invention and the Prior Art)

In the mobile station according to the present embodiment, when receiving the data of main information from the main branch, the mobile station does not indiscriminately perform the transmission power control only according to the TPC bit sent from the main branch through the downlink control channel, but only when it is actually detected that the cosed loop transmit diversity can be performed and that the mobile station is connected to the plurality of base stations as described above, the mobile station performs the transmission power control only according to the TPC bit sent from the main branch through the downlink control channel.

As described above, in the actual situation of these days, in which various base stations including the type which is not necessarily configured so as to perform the cosed loop transmit diversity are installed in places such as an indoor place and a station yard, only when the feedback information can be effectively used for the transmission state control, the transmission power of the sub-information uplink channel for transmitting the feedback information is controlled only on the basis of the TPC bit which is the first sub-information from the base station connected to the main information downlink channel (for example, on the basis of the hard handover).

Thus, it is possible to avoid the problem that as in the prior art, when the main information downlink channel is connected, the transmission power of the sub-information uplink channel is indiscriminately controlled so as to be uselessly increased, only on the basis of the first sub-information from the base station, without regard to whether or not the feedback information is effective, and without regard to the signal from the other base station connected on the basis of the soft handover, and that thereby the power is uselessly consumed. As a result, the power saving characteristic of the mobile station can be improved.

The state shown in FIG. 5 is the same as the state as described above with reference to FIG. 4 in that as for the transfer of data, the data is transmitted from the one base station 210 through the high-speed physical downlink shared channel 31 on the basis of the hard handover, while the control signal is transmitted and received to and from the plurality of base stations 210 and 220 through DPCH (the downlink channels 21 and 22 and the uplink channels 11 and 12) on the basis of the soft handover.

However, unlike the case shown in FIG. 4, in the case shown in FIG. 5, it is assumed that the TPC bit (down) which instructs to reduce the transmission power is sent from the base station 210 through the downlink channel 21 of DPCH, and at the same time, the TPC bit (up or down) which instructs to increase or reduce the transmission power is sent from the base station 220 through the downlink channel 22 of DPCH.

In the case shown in FIG. 5, even when the TPC bit sent from the base station 220 (sub-branch in the figure) instructs to increase or reduce the transmission power (up or down), the transmission power control is performed so as to reduce the transmission power of the uplink channel 11 of DPCH according to the TPC bit (down) which is sent from the base station 210 (main branch in the figure) and instructs to reduce the transmission power, without being affected by the TPC bit sent from the base station 220.

Therefore, as long as the cosed loop transmit diversity effectively functions, it is possible to perform control such that the feedback information is transmitted within a prescribed range of transmission power, and thereby possible to effectively avoid excessive consumption of power.
(Transmission Power Control Method in the Mobile Station as an Embodiment According to the Present Invention)

The above described technical idea of the present invention is a transmission power control method in the mobile station (100) which is configured enabling to receive main information, set as an object of communication between users, from the one corresponding base station (210) through the main information downlink channel (31) on the basis of the hard handover, and enabling to receive the first sub-information (TPC) representing a perticipant for maintaining a communication state, from the plurality of base stations (210 and 220) including the one base station through the sub-information downlink channels (21 and 22) on the basis of the soft handover, and which is configured enabling to transmit the second sub-information (TPC and FBI) representing a perticipant for maintaining the communication state, to the plurality of base stations (210 and 220) including the one base station (210), through the sub-information uplink channels (11 and 12) on the basis of the soft handover.

The technical idea of the present invention is also summarized as a transmission power control method including:

a first step (step S201 or step S302) of determining whether or not a cosed loop transmit diversity can be applied, which cosed loop transmit diversity is configured, according to a state of synthesized sub-information obtained by receiving and combining the first sub-information transmitted by using different antennas from the side of the base station (210) performing communication with the mobile station (100) in a specific area, to generate the second sub-information including feedback information (FBI) for making the base station (210) control the transmission of the first sub-information to maintain quality of the reception of the first sub-information, and is configured to transmit the generated second sub-information to the side of the base station (210);

a second step (step S202 or step S301) of determining whether or not the sub-information downlink channels (21 and 22) and the sub-information uplink channels (11 and 12) are connected to the plurality of base stations (210 and 220); and a third step (step S203+step S204 or step S303+step S304) of, when it is determined in the first step (step S201 or step S302) that the cosed loop transmit diversity can be applied (step S201: Yes or step S302: Yes), and when it is determined in the second step (step S202 or step S301) that the sub-information downlink channels and the sub-information uplink channels are connected to the plurality of base stations (step S202: Yes or step S301: Yes), controlling the transmission power of the sub-information uplink channel (11) only on the basis of the first sub-information (21: TPC) from the base station (210) connected to the main information downlink channel (31).

In this transmission power control method, the mobile station (100) is configured enabling to receive the main information, such as for example packet data, set as an object of communication between users, from the one corresponding base station (210) through the main information downlink channel (21) on the basis of the hard handover, and enabling to receive the first sub-information (TPC), such as for example control information, representing a perticipant for maintaining a communication state, from the plurality of base stations (210 and 220) including the one base station (210) through the sub-information downlink channels (21 and 22) on the basis of the soft handover, and is configured enabling to transmit the second sub-information, such as control information (TPC and FBI), representing a perticipant for maintaining the communication state, to the plurality of base stations (210 and 220) including the one base station (210) through the sub-information uplink channels (11 and 12) on the basis of the soft handover.

In this transmission power control method, when the mobile station (100) determines in the first step (step S201 or step S302) that a cosed loop transmit diversity can be applied, which cosed loop transmit diversity is configured, according to a state of synthesized sub-information obtained by receiving and combining the first sub-information transmitted by using different antennas from the side of the base station (210) performing communication with the mobile station (100) in a specific area, to generate the second sub-information including feedback information (FBI) for making the base station (210) control the transmission of the first sub-information to maintain quality of the reception of the first sub-information, and is configured to transmit the generated second sub-information to the side of the base station (210), and when the mobile station (100) determines in the second step (step S202 or step S301) that the sub-information downlink channels (21 and 22) and the sub-information uplink channels (11 and 12) are connected to the plurality of base stations (210 and 220), then the mobile station (100) controls in the third step (step S203+step S204 or step S303+step S304) the transmission power of the sub-information uplink channel only on the basis of the first sub-information (TPC) from the base station (210) connected to the main information downlink channel (31).

Thereby, in the mobile station (100), the transmission power of the sub-information uplink channel (11) is controlled only on the basis of the first sub-information (TPC) from the base station (210) connected to the main information downlink channel (31) on the basis of the hard handover, only when the cosed loop transmit diversity is performed and the connection with the plurality of base stations (210 and 220) is effected, that is, only when the feedback information is effectively used for the control of transmission state.

Thus, it is possible to avoid the problem that as in the prior art, when the main information downlink channel (31) is connected, the transmission power of the sub-information uplink channel (11) is indiscriminately controlled so as to be uselessly increased, only on the basis of the first sub-information (TPC) from the base station (210), without regard to whether or not the feedback information is effective, and without regard to the signal from the other base station (220) connected on the basis of the soft handover, and that thereby the power is uselessly consumed. As a result, the power saving characteristic in the mobile station can be improved.

CONCLUSION

The above described technique for improving the power saving characteristic in a mobile station which is usually driven by a battery and has a limited power supply capacity, provides a method to cope with the strongest demand to suppress the power consumption as much as possible and to secure the continuous operation time after charging as long as possible.

Note that the above described technique relating to the mobile station and the transmission power control method in the mobile station, according to the present invention, can be applied to a so-called short range radio communication system or each communication apparatus serving as a component of the short range radio communication system.

The present invention can be used to realize a power saving technique in a base station on the basis of a closed loop transmit diversity in a transmission technique for space diversity in which signals transmitted from a plurality of antennas of the base station are received and synthesized by a reception terminal (mobile station).

What is claimed is:

1. A mobile station for communicating with a plurality of base stations including a main branch base station and a sub branch base station, the mobile station comprising:

an RF transceiver section for receiving main information, as an object of communication between users, from the main branch base station through a main information downlink channel, receiving first sub-information for maintaining a communication state, through a sub-information downlink channel from the main branch base station to the mobile station, and transmitting second sub-information for maintaining the communication state through a sub-information uplink channel from the mobile station to the sub branch base station;

a communication method determining section for determining whether or not a closed loop transmit diversity can be applied, according to the first sub-information transmitted from the main branch base station, so as to generate the second sub-information including feedback information for making the base station control transmission of the first sub-information to maintain quality associated with the reception of the first sub-information and transmit the generated second sub-information to the sub branch base station;

a communication base station determining section for determining whether or not the sub-information downlink channel and the sub-information uplink channel are connected to the plurality of base stations; and a transmission power control section for controlling a transmission power of the sub-information uplink channel from the mobile station to the sub branch base station, only on the basis of the first sub-information from the main branch base station through the main information downlink channel, when the communication method determining section determines that the closed loop transmit diversity can be applied, and when the communication base station determining section determines that the sub-information downlink channel and the sub-information uplink channel are connected to the plurality of base stations;

wherein the first sub-information includes transmission power control information for controlling the transmission power of the sub-information uplink channel, and the first sub-information is received through the sub-information downlink channel that is a downlink control channel.

2. The mobile station according to claim 1, wherein the main information is received through the main information downlink channel that is a downlink data channel, in a communication method of High Speed Downlink Packet Access (HSDPA).

3. The mobile station according to claim 1, wherein phase correction information of the main information is included in the second sub-information, and the second sub-information is received through the sub-information uplink channel that is an uplink control channel.

4. A transmission power control method in a mobile station for communicating with a plurality of base stations including a main branch base station and a sub branch base station, the transmission power control method comprising:

receiving main information, as an object of communication between users, from the main branch base station through a main information downlink channel, receiving first sub-information for maintaining a communication state, through a sub-information downlink channel from the main branch base station to the mobile station, and transmitting second sub-information for maintaining the communication state through a sub-information uplink channel from the mobile station to the sub branch base station;

determining whether or not a closed loop transmit diversity can be applied, according to the first sub-information transmitted from the main branch base station, so as to generate the second sub-information including feedback information for making the base station control transmission of the first sub-information to maintain quality associated with the reception of the first sub-information and transmit the generated second sub-information to the sub branch base station;

determining whether or not the sub-information downlink channel and the sub-information uplink channel are connected to the plurality of base stations; and controlling a transmission power of the sub-information uplink channel from the mobile station to the sub branch base station, only on the basis of the first sub-information from the main branch base station through the main information downlink channel, when it is determined that the closed loop transmit diversity can be applied, and when it is determined that the sub-information downlink channel and the sub-information uplink channel are connected to the plurality of base stations;

wherein the first sub-information includes transmission power control information for controlling the transmission power of the sub-information uplink channel, and the first sub-information is received through the sub-information downlink channel that is a downlink control channel.

5. A mobile station for communicating with a plurality of base stations including a main branch base station and a sub branch base station, the mobile station comprising:

an RF transceiver section for receiving main information, as an object of communication between users, from the main branch base station through a main information downlink channel, receiving first sub-information for maintaining a communication state, through a sub-information downlink channel from the main branch base station to the mobile station, and transmitting second sub-information for maintaining the communication state through a sub-information uplink channel from the mobile station to the sub branch base station;

a communication method determining section for determining whether or not a closed loop transmit diversity can be applied, according to the first sub-information transmitted from the main branch base station, so as to generate the second sub-information including feedback information for making the base station control transmission of the first sub-information to maintain quality associated with the reception of the first sub-information and transmit the generated second sub-information to the sub branch base station;

a communication base station determining section for determining whether or not the sub-information downlink channel and the sub-information uplink channel are connected to the plurality of base stations; and a transmission power control section for controlling a transmission power of the sub-information uplink channel from the mobile station to the sub branch base station, only on the basis of the first sub-information from the main branch base station through the main information downlink channel, when the communication method determining section determines that the closed loop transmit diversity can be applied, and when the communication base station determining section determines that the sub-information downlink channel and the sub-information uplink channel are connected to the plurality of base stations;

wherein phase correction information of the main information is included in the second sub-information, and the second sub-information is received through the sub-information uplink channel that is an uplink control channel.

6. The mobile station according to claim 5, wherein the first sub-information includes transmission power control information for controlling the transmission power of the sub-information uplink channel, and the first sub-information is received through the sub-information downlink channel that is a downlink control channel.

7. A mobile station for communicating with a plurality of base stations including a main branch base station and a sub branch base station, the mobile station comprising:

an RF transceiver section for receiving main information, as an object of communication between users, from the main branch base station through a main information downlink channel, receiving first sub-information for maintaining a communication state, through a sub-information downlink channel from the main branch base station to the mobile station, and transmitting second sub-information for maintaining the communication state through a sub-information uplink channel from the mobile station to the sub branch base station;

a communication method determining section for determining whether or not a closed loop transmit diversity can be applied, according to the first sub-information transmitted from the main branch base station, so as to generate the second sub-information including feedback information for making the base station control transmission of the first sub-information to maintain quality associated with the reception of the first sub-information and transmit the generated second sub-information to the sub branch base station;

a communication base station determining section for determining whether or not the sub-information downlink channel and the sub-information uplink channel are connected to the plurality of base stations; and a transmission power control section for controlling a transmission power of the sub-information uplink channel from the mobile station to the sub branch base station, only on the basis of the first sub-information from the main branch base station through the main information downlink channel, when the communication method determining section determines that the closed loop transmit diversity can be applied, and when the communication base station determining section determines that the sub-information downlink channel and the sub-information uplink channel are connected to the plurality of base stations;

wherein the first sub-information includes transmission power control information for controlling the transmission power of the sub-information uplink channel, and the first sub-information is received through the sub-information downlink channel that is a downlink control channel; and wherein phase correction information of the main information is included in the second sub-information, and the second sub-information is received through the sub-information uplink channel that is an uplink control channel.

* * * * *